United States Patent
Okuoka et al.

(10) Patent No.: US 12,372,752 B2
(45) Date of Patent: Jul. 29, 2025

(54) OPTICAL SYSTEM AND IMAGE PICKUP APPARATUS HAVING THE SAME

(71) Applicant: CANON KABUSHIKI KAISHA, Tokyo (JP)

(72) Inventors: Shinya Okuoka, Tochigi (JP); Takeo Mori, Tochigi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 599 days.

(21) Appl. No.: 17/718,559

(22) Filed: Apr. 12, 2022

(65) Prior Publication Data
US 2022/0334363 A1   Oct. 20, 2022

(30) Foreign Application Priority Data
Apr. 15, 2021   (JP) .................. 2021-069022

(51) Int. Cl.
G02B 13/00   (2006.01)
G02B 13/18   (2006.01)

(52) U.S. Cl.
CPC ......... G02B 13/0045 (2013.01); G02B 13/18 (2013.01)

(58) Field of Classification Search
CPC ...... G02B 13/0045; G02B 13/18; G02B 9/60; G02B 13/006; G02B 13/0015
See application file for complete search history.

(56) References Cited

U.S. PATENT DOCUMENTS

| | | | |
|---|---|---|---|
| 9,804,358 B2 * | 10/2017 | Nabeta | G02B 27/0025 |
| 9,829,681 B2 | 11/2017 | Mori | |
| 10,585,268 B2 | 3/2020 | Okuoka | |
| 10,670,832 B2 | 6/2020 | Mori | |
| 10,802,246 B2 | 10/2020 | Okuoka | |
| 10,816,763 B2 * | 10/2020 | Park | G02B 13/18 |
| 10,887,510 B2 | 1/2021 | Mori | |
| 2015/0277083 A1 * | 10/2015 | Chae | G02B 9/64 359/708 |
| 2016/0054543 A1 | 2/2016 | Nabeta | |
| 2016/0139368 A1 * | 5/2016 | You | G02B 9/62 359/713 |

(Continued)

FOREIGN PATENT DOCUMENTS

| | | |
|---|---|---|
| CN | 103576288 A | 2/2014 |
| CN | 105242380 A | 1/2016 |

(Continued)

OTHER PUBLICATIONS

Notice of Reasons for Refusal issued by the Japanese Patent Office on Jan. 21, 2025 in corresponding JP Patent Application No. 2021-069022, with English translation.

(Continued)

*Primary Examiner* — Mustak Choudhury
(74) *Attorney, Agent, or Firm* — Carter, DeLuca & Farrell LLP (57) ABSTRACT

An optical system includes a plurality of lenses and a diaphragm. The plurality of lenses consist of, in order from an object side to an image side, a first lens having a positive refractive power, a second lens having a positive refractive power, a third lens having a negative refractive power, a fourth lens, a fifth lens, and a sixth lens. The diaphragm is located between the first lens and the second lens. A predetermined condition is satisfied.

10 Claims, 4 Drawing Sheets

(56) References Cited

U.S. PATENT DOCUMENTS

2017/0082833 A1   3/2017  Huang
2020/0400919 A1  12/2020  Shinohara et al.
2021/0231931 A1   7/2021  Mori et al.

FOREIGN PATENT DOCUMENTS

| | | |
|---|---|---|
| CN | 105607224 A | 5/2016 |
| CN | 110045490 A | 7/2019 |
| CN | 211955960 U | 11/2020 |
| JP | H01-128024 A | 5/1989 |
| JP | 2006-308611 A | 11/2006 |
| JP | 2008-250136 A | 10/2008 |
| JP | 2015-176009 A | 10/2015 |
| JP | 2016-048274 A | 4/2016 |
| JP | 2020-024337 A | 2/2020 |
| JP | 2021-135489 A | 9/2021 |
| WO | 2015/060166 A1 | 4/2015 |

OTHER PUBLICATIONS

Chinese Office Action issued by the China National Intellectual Property Administration on May 26, 2025 in corresponding CN Patent Application No. 202210377890.2, with English translation.

* cited by examiner

OPTICAL SYSTEM AND IMAGE PICKUP APPARATUS HAVING THE SAME

BACKGROUND OF THE INVENTION

Field of the Invention

The present invention relates to an optical system and is suitable for a digital video camera, a digital still camera, a broadcasting camera, a film-based camera, a surveillance camera, and the like.

Description of the Related Art

In recent years, image pickup apparatuses have been made smaller, and optical systems (imaging optical systems) that are used in the image pickup apparatuses have been required to have a short overall lens length and high optical performance.

As an optical system that meets these demands, Japanese Patent Laid-Open No. ("JP") 2020-24337 discloses an optical system that consists of six lenses.

In an attempt to shorten the overall lens length of the optical system, various aberrations, such as a spherical aberration and a curvature of field are likely to increase, and optical performance is likely to deteriorate. When a position of an aperture stop (diaphragm) approaches an imaging plane due to shortening of the overall lens length, shading is likely to occur because a light beam is obliquely incident on a periphery of an image sensor in an image pickup apparatus such as a digital still camera (oblique incidence) that includes the image sensor. Shading can be restrained by disposing the aperture stop closer to the object than the center of the optical system, but then it becomes difficult to satisfactorily correct various aberrations because the lens configuration is asymmetrical with respect to the aperture stop of the optical system, and the number of lenses tends to increase. In the optical system disclosed in JP 2020-24337, both reducing of the overall lens length and high optical performance were insufficient.

In order to reduce the overall lens length and to improve the performance while the oblique incidence on the periphery of the image sensor is suppressed, it is important to properly set a lens configuration (such as a material, the number, and a shape) of the optical system in addition to a design of a refractive power of each lens.

SUMMARY OF THE INVENTION

The present invention provides an optical system having a short overall lens length and excellent optical performance while suppressing an oblique incidence on a periphery of an image sensor.

An optical system according to one aspect of the present invention a plurality of lenses and a diaphragm. The plurality of lenses consist of, in order from an object side to an image side, a first lens having a positive refractive power, a second lens having a positive refractive power, a third lens having a negative refractive power, a fourth lens, a fifth lens, and a sixth lens. The diaphragm is located between the first lens and the second lens. The following conditional expressions are satisfied:

$$0.5 < SPIP/TTL < 1.0$$

$$1.65 < PNdave < 2.00$$

where SPIP is a distance on an optical axis from the diaphragm to an image plane when a backfocus is expressed by an air-equivalent length, TTL is a distance on the optical axis from a lens surface on the object side of the first lens to the image plane when the backfocus is expressed by the air-equivalent length, and PNdave is an average value of refractive indexes of all materials of positive lenses included in the optical system for d-line. An image pickup apparatus having the above optical system also constitutes another aspect of the present invention.

Further features of the present invention will become apparent from the following description of exemplary embodiments with reference to the attached drawings.

DESCRIPTION OF THE EMBODIMENTS

Referring now to the accompanying drawings, a description will be given of embodiments according to the present invention.

Figure 1:
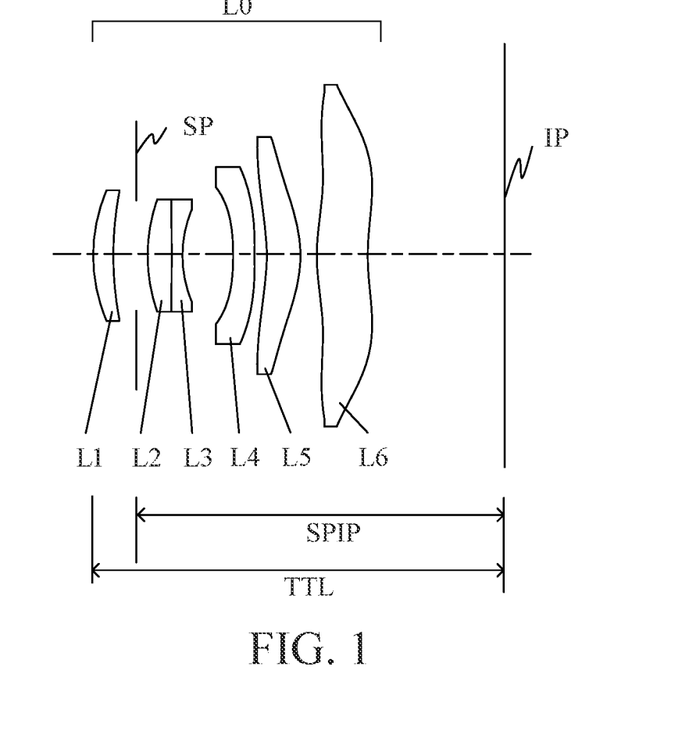
FIG. 1 is a sectional view of an optical system according to Example 1.
Figure 3:
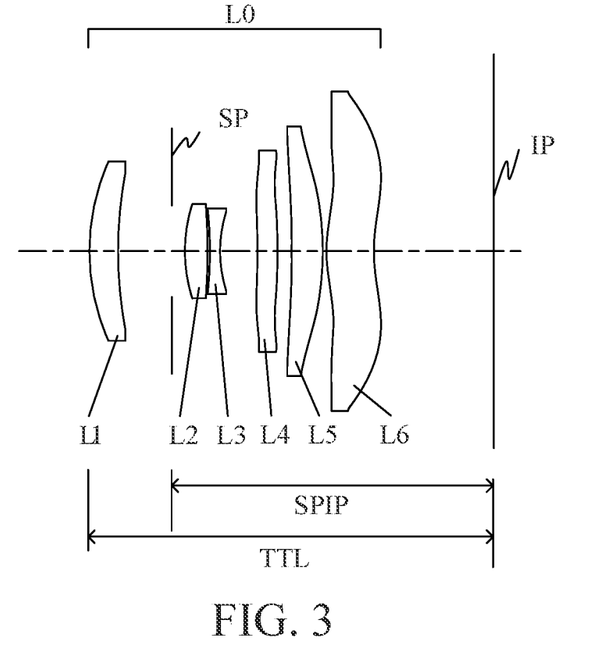
FIG. 3 is a sectional view of an optical system according to Example 2.
Figure 5:
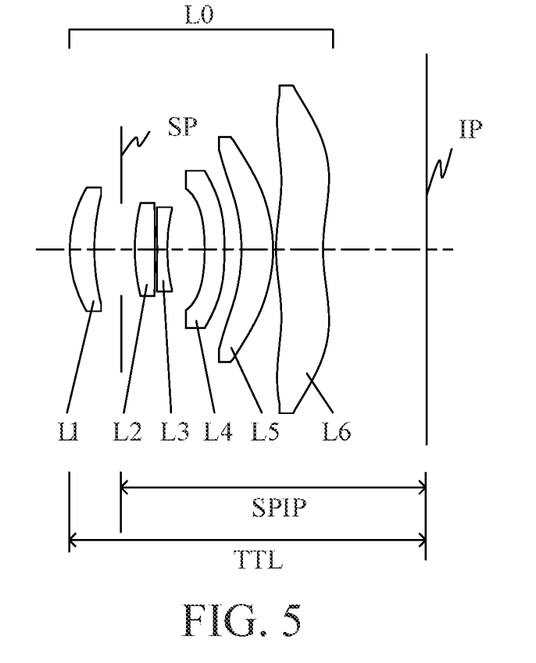
FIG. 5 is a sectional view of an optical system according to Example 3.

FIGS. 1, 3, and 5 are lens sectional views of optical systems according to Examples 1 to 3 in an in-focus state at infinity, respectively.

An optical system L0 according to each example is an optical system that is used for an image pickup apparatus such as a digital video camera, a digital still camera, a broadcasting camera, a film-based camera, and a surveillance camera.

In each lens sectional view, a left side is an object side (enlargement side) and a right side is an image side (reduction side). The optical system L0 according to each example includes a plurality of lenses.

The optical system L0 according to each example consists of, in order from the object side to the image side, a first lens L1 having a positive refractive power, an aperture stop (diaphragm) SP, a second lens L2 having a positive refractive power, and a third lens L3 having a negative refractive power, a fourth lens L4, a fifth lens L5, and a sixth lens L6.

In each lens sectional view, "Li" (i is a natural number) represents an "i-th lens" when lenses in the optical system L0 are counted in order from the object side to the image side. SP represents the aperture stop that determines (limits) a light beam of an open F-number (Fno). IP represents an image plane, on which an imaging plane of a solid-state image sensor (photoelectric conversion element) such as a CCD sensor or a CMOS sensor is placed when the optical system L0 according to each example is used as an imaging optical system of a digital video camera or a digital still camera. When the optical system L0 according to each example is used as an imaging optical system of a film-based camera, a photosensitive plane corresponding to a film plane is placed on the image plane IP.

By moving the entire optical system L0 along the optical axis, focusing is performed from an infinity object point to a close (short-distance) object point.

The optical system L0 according to each example may function as an image stabilizing optical system by decentering one or more lenses so as to include a component orthogonal to the optical axis during image stabilization. A parallel plate having substantially no refractive power such as a low-pass filter or an infrared cut filter may be disposed between the lens closest to the image plane and the imaging plane.

Figure 2:
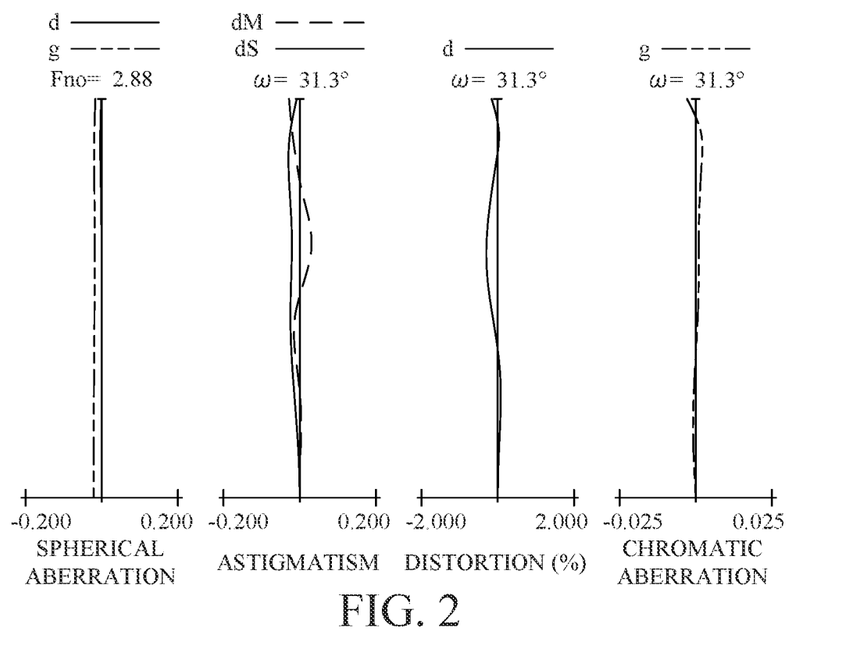
FIG. 2 is an aberration diagram of the optical system according to Example 1.
Figure 4:
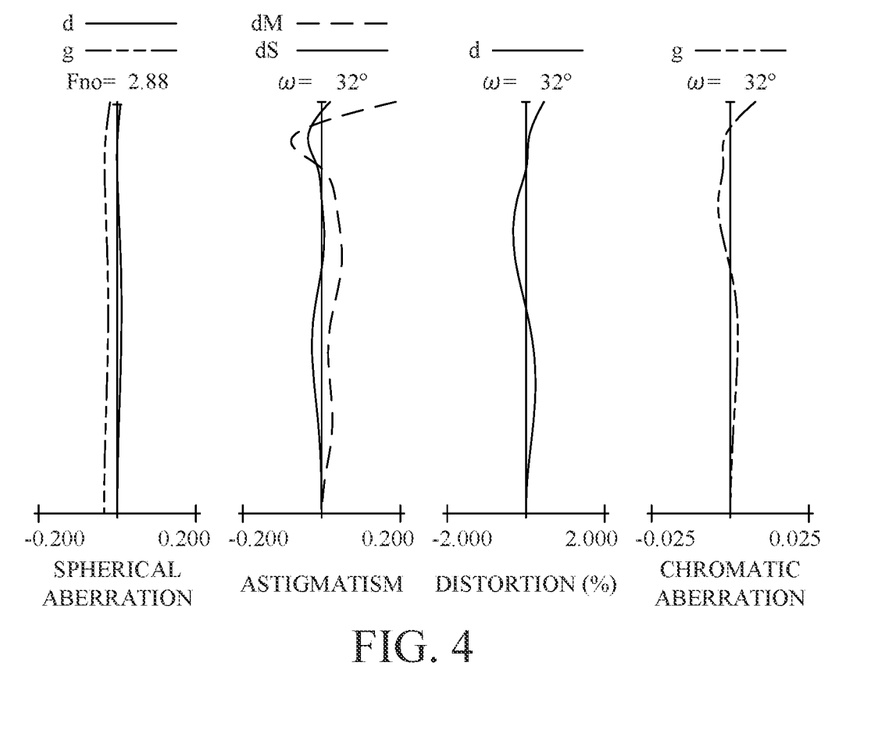
FIG. 4 is an aberration diagram of the optical system according to Example 2.
Figure 6:
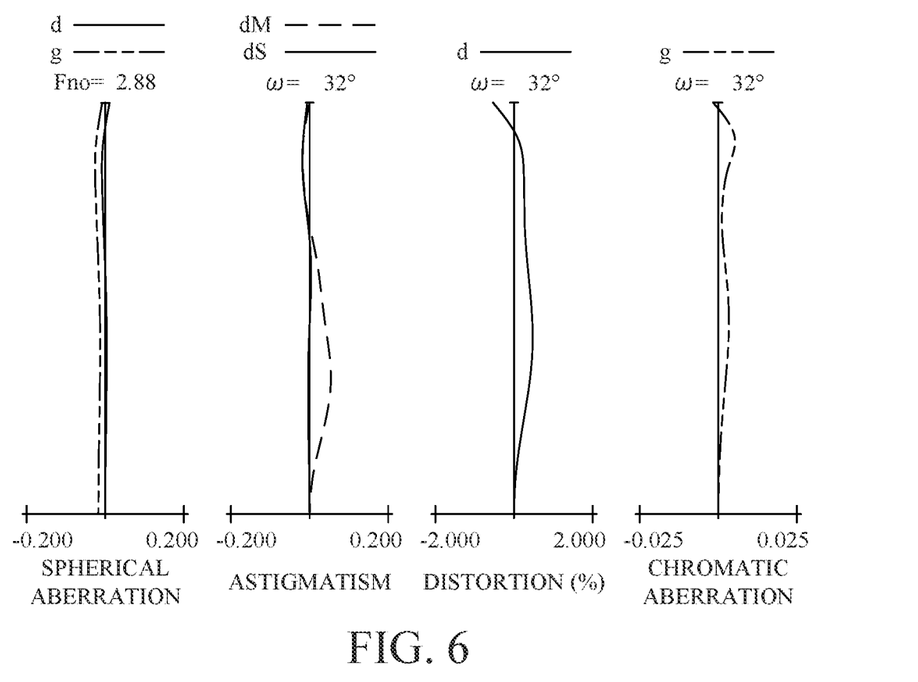
FIG. 6 is an aberration diagram of the optical system according to Example 3.

FIGS. 2, 4, and 6 are aberration diagrams of the optical system L0 according to Examples 1 to Example 3 in an in-focus state at infinity.

In a spherical aberration diagram, Fno represents an F-number and indicates spherical aberration amounts for the d-line (wavelength 587.6 nm) and the g-line (wavelength 435.8 nm). In an astigmatism diagram, dS represents an astigmatism amount on a sagittal image plane, and dM represents an astigmatism amount on a meridional image plane. A distortion diagram illustrates a distortion amount for the d-line. A chromatic aberration diagram illustrates a chromatic aberration amount for the g-line. ω represents an imaging half angle of view (°), which is an angle of view calculated by paraxial calculation.

A description will now be given of a characteristic configuration of the optical system L0 according to each example.

The optical system L0 according to each example consists of, in order from the object side to the image side, a first lens L1 having a positive refractive power, an aperture stop SP, a second lens L2 having a positive refractive power, a third lens L3 having a negative refractive power, a fourth lens L4, a fifth lens L5, and a sixth lens L6.

The optical system L0 according to each example satisfies the following conditional expressions (1) and (2):

$$0.5 < SPIP/TTL < 1.0 \quad (1)$$

$$1.65 < PNdave < 2.00 \quad (2)$$

where SPIP is a distance on an optical axis from the aperture stop SP to the image plane IP when a backfocus is expressed by an air-equivalent length. TTL is an overall lens length (a distance on the optical axis from a lens surface on the object side of the first lens L1 to the image plane IP to the image plane IP when the backfocus is expressed by the air-equivalent length). PNdave is an average refractive index for the d-line of all materials of the positive lenses included in the optical system L0.

The conditional expression (1) relates to a ratio of the distance on the optical axis from the aperture stop SP to the image plane IP when the backfocus is expressed by the air-equivalent length, to the overall lens length. When the ratio is lower than the lower limit in the conditional expression (1), the position of the aperture stop SP approaches the image plane IP and thus an incident angle of an off-axis light beam on the image plane IP becomes large. This is not preferable because shading occurs in the periphery of the image sensor. When the ratio is higher than the upper limit in the conditional expression (1), the position of the aperture stop SP is closer to the object than the first lens L1. In this case, the lens configuration of the optical system becomes asymmetric with respect to the aperture stop SP and thus it becomes difficult to satisfactorily correct various aberrations. In addition, the diameter of the lens close to the image plane IP tends to be large, which makes it difficult to reduce the size of the lens.

The conditional expression (2) relates to an average refractive index of all the materials of the positive lenses included in the optical system L0 for the d-line. If the average refractive index of the materials of the positive lenses is smaller than the lower limit in the conditional expression (2), the Petzval sum tends to be large and it becomes difficult to correct a curvature of field. When the average refractive index of the materials of the positive lenses becomes large, it becomes easy to correct the curvature of field and the like, but in general, a dispersion of a material having a high refractive index tends to be larger than that of a material having a low refractive index. Therefore, if the average refractive index of the materials of the positive lenses is higher than the upper limit in the conditional expression (2), it becomes difficult to correct a longitudinal chromatic aberration.

The optical system L0 according to each example having the above configuration realizes a short overall lens length and excellent optical performance while suppressing an oblique incidence on the periphery of the image sensor.

The numerical ranges of the conditional expressions (1) and (2) may be replaced with those of the following conditional expressions (1a) and (2a):

$$0.6 < SPIP/TTL < 0.9 \quad (1a)$$

$$1.65 < PNdave < 1.90 \quad (2a)$$

The numerical ranges of the conditional expressions (1) and (2) may be replaced with those of the following conditional expressions (1b) and (2b):

$$0.7 < SPIP/TTL < 0.9 \quad (1b)$$

$$1.70 < PNdave < 1.80 \quad (2b)$$

A description will now be given of conditions that the optical system L0 according to each example may satisfy.

The optical system L0 according to each example may satisfy one or more of the following conditional expressions (3) to (10):

$$0.80 < f1/f < 2.00 \quad (3)$$

$$0.30 < f2/f < 0.80 \quad (4)$$

$$-0.70 < f3/f < -0.25 \quad (5)$$

$$0.20 < BF/TTL < 0.40 \quad (6)$$

$$1.5 < (L1R2+L1R1)/(L1R2-L1R1) < 4.0 \quad (7)$$

$$15 < Nvdave < 30 \quad (8)$$

$$0.90 < TTL/f < 1.40 \quad (9)$$

Here, f1 is a focal length of the first lens L1. f is a focal length of the optical system L0. f2 is a focal length of the second lens L2. f3 is a focal length of the third lens L3. BF is a backfocus of the optical system L0, and is expressed by an air-equivalent length of the distance on the optical axis from a lens surface on the image side of the sixth lens L6 to the image plane IP. L1R2 is a radius of curvature of the lens surface on the image side of the first lens L1. L1R1 is a radius of curvature of the lens surface on the object side of the first lens L1. Nvdave is an average Abbe number of all materials of negative lenses included in the optical system L0 for the d-line.

The conditional expression (3) relates to a ratio of the focal length of the first lens L1 to the focal length of the optical system L0. If the ratio is lower than the lower limit in the conditional expression (3), the refractive power of the first lens L1 becomes strong, and it becomes difficult to sufficiently correct various aberrations such as a spherical aberration. On the other hand, if the ratio is higher than the upper limit in the conditional expression (3), the refractive power of the first lens L1 becomes weak, and it becomes difficult to sufficiently shorten the overall lens length.

The conditional expression (4) relates to a ratio of the focal length of the second lens L2 to the focal length of the optical system L0. If the ratio is lower than the lower limit in the conditional expression (4), the refractive power of the second lens L2 becomes strong and it becomes difficult to sufficiently correct various aberrations such as a spherical aberration. On the other hand, if the ratio is higher than the upper limit in the conditional expression (4), the refractive power of the second lens L2 becomes weak and it becomes difficult to sufficiently shorten the overall lens length.

The conditional expression (5) relates to a ratio of the focal length of the third lens L3 to the focal length of the optical system L0. If the ratio is lower than the lower limit in the conditional expression (5), the refractive power of the third lens L3 becomes weak and it becomes difficult to sufficiently shorten the overall lens length. On the other hand, if the ratio is higher than the upper limit in the conditional expression (5), the refractive power of the third lens L3 becomes strong and it becomes difficult to sufficiently correct various aberrations such as a spherical aberration.

The conditional expression (6) relates to a ratio of the backfocus of the optical system L0 to the overall lens length. If the ratio is lower than the lower limit in the conditional expression (6), the backfocus becomes too short, the incident angle of the off-axis light beam on the image plane IP becomes large, and shading occurs. Alternatively, since the lens diameter becomes large in order to suppress shading, it becomes difficult to reduce the size of the lens. On the other hand, if the ratio is higher than the upper limit in the conditional expression (6), the backfocus becomes too long and the overall lens length increases.

The conditional expression (7) relates to the shape of the first lens L1. Satisfying the conditional expression (7) means that the first lens L1 has a meniscus shape with a convex on the object side because the first lens L1 has the positive refractive power. By satisfying the conditional expression (7), various aberrations such as a spherical aberration can be satisfactorily corrected.

The conditional expression (8) relates to an average Abbe number of all materials of the negative lenses included in the optical system L0 for the d-line. If the average Abbe number is lower than the lower limit in the conditional expression (8), the dispersion becomes large and it becomes difficult to correct longitudinal and lateral chromatic aberrations. Moreover, in general, the refractive index of a material having a large dispersion tends to be higher than that of a material having a small dispersion. Therefore, the average refractive index of the negative lenses becomes high, the Petzval sum tends to be large, and it becomes difficult to correct a curvature of field, etc. On the other hand, if the average Abbe number is higher than the upper limit in the conditional expression (8), the dispersion becomes too small and it becomes difficult to correct the longitudinal and lateral chromatic aberrations.

The conditional expression (9) relates to a ratio of the focal length of the optical system L0 to the overall lens length. If the ratio is lower than the lower limit in the conditional expression (9), the overall lens length becomes too short and it becomes difficult to sufficiently correct various aberrations such as a spherical aberration. On the other hand, if the ratio is higher than the upper limit in the conditional expression (9), the overall lens length becomes too long.

The numerical ranges of the conditional expressions (3) to (9) may be replaced with those of the following conditional expressions (3a) to (9a):

$$0.80 < f1/f < 1.80 \quad (3a)$$

$$0.30 < f2/f < 0.70 \quad (4a)$$

$$-0.60 < f3/f < -0.25 \quad (5a)$$

$$0.25 < BF/TTL < 0.38 \quad (6a)$$

$$2.0 < (L1R2+L1R1)/(L1R2-L1R1) < 3.5 \quad (7a)$$

$$15 < Nvdave < 25 \quad (8a)$$

$$1.00 < TTL/f < 1.30 \quad (9a)$$

The numerical ranges of the conditional expressions (3) to (9) may be replaced with those of the following conditional expressions (3b) to (9b).

$$0.80 < f1/f < 1.60 \quad (3b)$$

$$0.30 < f2/f < 0.65 \quad (4b)$$

$$-0.55 < f3/f < -0.30 \quad (5b)$$

$$0.28 < BF/TTL < 0.35 \quad (6b)$$

$$2.5 < (L1R2+L1R1)/(L1R2-L1R1) < 3.5 \quad (7b)$$

$$18 < Nvdave < 25 \quad (8b)$$

$$1.10 < TTL/f < 1.30 \quad (9b)$$

A description will now be given of a configuration that may be satisfied by the optical system L0 according to each example.

The optical system L0 may include two or more negative lenses. This configuration facilitates a correction of a curvature of field and corrections of longitudinal and lateral chromatic aberrations.

The fourth lens L4 may include an area having a negative refractive power near the optical axis. The fourth lens L4 may include aspherical surfaces on both sides, include an area where a lens surface on the object side of the fourth lens L4 is a concave surface near the optical axis, and include an area where a lens surface on the image side of the fourth lens L4 is a convex surface near the optical axis. This configuration facilitates a correction of a curvature of field.

The fifth lens L5 may include an area having a positive refractive power near the optical axis. The fifth lens L5 may include aspherical surfaces on both sides, include an area where a lens surface on the object side of the fifth lens L5 is a concave surface near the optical axis, and include an area where a lens surface on the image side of the fifth lens L5 is a convex surface near the optical axis. This configuration facilitates a correction of a curvature of field.

The sixth lens L6 may include an area having a positive refractive power near the optical axis. The sixth lens L6 may include aspherical surfaces on both sides, include an area where a lens surface on the object side of the sixth lens L6 is a convex surface near the optical axis, and include an area where a lens surface on the image side of the sixth lens L6 is a concave surface near the optical axis. This configuration facilitates a correction of a curvature of field.

It is a paraxial area that is located near the optical axis, and in the case of an aspherical lens, the concave and convex surfaces near the optical axis are defined by a sign of a paraxial radius of curvature. The sign of the refractive power is also calculated from the paraxial radius of curvature.

A detailed description will now be given of the optical system L0 according to each example.

The optical system L0 according to each example consists of, in order from the object side to the image side, the first lens L1, the aperture stop SP, the second lens L2, the third lens L3, the fourth lens L4, the fifth lens L5, and the sixth lens L6. The first lens L1 has the positive refractive power. The second lens L2 has the positive refractive power. The third lens L3 has the negative refractive power. The fourth lens L4 has a negative refractive power near the optical axis. The fifth lens L5 has a positive refractive power near the optical axis. The sixth lens L6 has a positive refractive power near the optical axis. In the fourth lens L4, aspherical surfaces are formed on both surfaces. The surface on the object side of the fourth lens L4 is a concave surface on the object side near the optical axis, and the lens surface on the image side of the fourth lens L4 is a convex surface on the image side near the optical axis. In the fifth lens L5, aspherical surfaces are formed on both surfaces. The surface on the object side of the fifth lens L5 is a concave surface on the object side near the optical axis, and the lens surface on the image side of the fifth lens L5 is the convex surface on the image side near the optical axis. In the sixth lens L6, aspherical surfaces are formed on both surfaces. The surface on the object side of the sixth lens L6 is a convex surface on the object side near the optical axis, and the lens surface on the image side of the sixth lens L6 is a concave surface on the image side near the optical axis.

Numerical examples 1 to 3 corresponding to Examples 1 to 3, respectively, will be illustrated below.

In surface data of each numerical example, r represents a radius of curvature of each optical surface, and d (mm) represents an on-axis interval (distance on the optical axis) between an m-th surface and an (m+1)-th surface, where m is a number of a surface counted from the light incident side. nd represents a refractive index of each optical element for the d-line, and vd represents an Abbe number of the optical element. The Abbe number vd of a certain material is calculated as follows:

$$vd=(Nd-1)/(NF-NC)$$

where Nd, NF, and NC are refractive indexes for the d-line (587.6 mu), the F-line (486.1 nm), and the C-line (656.3 nm) in the Fraunhofer lines.

In each numerical example, d, focal length (mm). F-number, and half angle of view (°) are all values when the optical system of each example focuses on an infinity object. A "backfocus (BF)" is a distance on the optical axis from the final lens surface (the lens surface closest to the image plane) to the paraxial image plane in terms of the air-equivalent length. The "overall lens length" is a length obtained by adding the backfocus to a distance on the optical axis from the lens surface closest to the object to the final surface.

An entrance pupil position is expressed by a distance from the lens surface (first surface) closest to the object to an entrance pupil. An exit pupil position is expressed by a distance from the lens surface (final lens surface) closest to the image plane to the exit pupil. A front principal point position is expressed by a distance from the first lens surface to a front principal point. A rear principal point position is expressed by a distance from the final lens surface to a rear principal point. Each of these numerical values is a paraxial amount, and a positive sign is set in a direction from the object side to the image side.

If the optical surface is aspheric, an asterisk * is attached to a right side of the surface number. The aspherical shape is expressed as follows.

$$x=(h^2/R)/[1+\{1-(1+k)(h/R)^2\}^{1/2}]+A4 \times h^4+A6 \times h^6+A8 \times h^8+A10 \times h^{10}+A12 \times h^{12}+A14 \times h^{14}$$

where x is a displacement amount from a surface vertex in the optical axis direction, h is a height from the optical axis in the direction orthogonal to the optical axis, R is a paraxial radius of curvature, k is a conical constant, and A4, A6, A8, A10, A12, and A14 are aspherical coefficients of respective orders. In addition, "e±XX" in each aspherical coefficient means "$\times 10^{\pm XX}$".

Numerical Example 1

| | | UNIT: mm | | |
|---|---|---|---|---|
| | | Surface Data | | |
| Surface No. | r | d | nd | vd |
| 1 | 6.172 | 0.75 | 1.78800 | 47.4 |
| 2 | 12.606 | 0.86 | | |
| 3 (Diaphragm) | ∞ | 0.42 | | |
| 4 | 6.266 | 0.90 | 1.88300 | 40.8 |
| 5 | −115.141 | 0.40 | 1.72825 | 28.5 |
| 6 | 4.413 | 1.89 | | |
| 7* | −11.615 | 0.80 | 1.67070 | 19.3 |
| 8* | −68.826 | 0.46 | | |
| 9* | −6.873 | 1.25 | 1.61550 | 25.8 |
| 10* | −4.882 | 0.61 | | |
| 11* | 7.239 | 1.90 | 1.53500 | 56.0 |
| 12* | 8.458 | BF | | |
| Image Plane | ∞ | | | |

ASPHERIC DATA

7th Surface
K = 0.00000e+000 A 4 = −1.17343e−002 A 6 = 6.62086e−004 A 8 = 7.11821e−005
A10 = −1.57795e−005 A12 = 1.24628e−007

-continued

| UNIT: mm |
|---|

8th Surface
K = 0.00000e+000 A 4 = −9.33591e−003 A 6 = 9.10480e−004 A 8 = −5.56359e−005
A10 = 1.86493e−006 A12 = −2.51762e−008
9th Surface
K = 0.00000e+000 A 4 = 8.82669e−003 A 6 = −7.18264e−004 A 8 = 3.71234e−005
A10 = −8.01992e−007 A12 = 8.77474e−010
10th Surface
K = 0.00000e+000 A 4 = 3.92160e−003 A 6 = 9.31874e−005 A 8 = −8.10394e−006
A10 = 2.91020e−007 A12 = −2.38551e−009
11th Surface
K = 0.00000e+000 A 4 = −7.49451e−003 A 6 = 3.07261e−004 A 8 = −5.64465e−006
A10 = 9.78774e−010 A12 = 1.44863e−009 A14 = −1.61988e−011
12th Surface
K = 0.00000e+000 A 4 = −6.85204e−003 A 6 = 2.82220e−004 A 8 = −1.01045e−005
A10 = 2.47381e−007 A12 = −3.28540e−009 A14 = 1.78261e−011

| | |
|---|---|
| Focal length | 13.00 |
| F-number | 2.88 |
| Half angle of view (°) | 31.25 |
| Image height | 7.89 |
| Overall lens length | 15.35 |
| BF | 5.11 |
| Entrance pupil position | 1.47 |
| Exit pupil position | −7.51 |
| Front principal position | 1.07 |
| Rear principal position | −7.89 |

| SINGLE LENS DATA | | |
|---|---|---|
| Lens | Starting surface | Focal length |
| 1 | 1 | 14.60 |
| 2 | 4 | 6.75 |
| 3 | 5 | −5.83 |
| 4 | 7 | −20.95 |
| 5 | 9 | 22.10 |
| 6 | 11 | 60.82 |

Numerical Example 2

| UNIT: mm | | | | |
|---|---|---|---|---|
| Surface Data | | | | |
| Surface No. | r | d | nd | vd |
| 1 | 8.823 | 1.15 | 1.88300 | 40.8 |
| 2 | 16.892 | 2.16 | | |
| 3 (Diaphragm) | ∞ | 0.52 | | |
| 4 | 6.147 | 0.91 | 2.00100 | 29.1 |
| 5 | −25.011 | 0.10 | | |
| 6 | −14.102 | 0.40 | 1.92286 | 20.9 |
| 7 | 5.154 | 1.50 | | |
| 8* | −45.358 | 0.80 | 1.67070 | 19.3 |
| 9* | −357.393 | 0.57 | | |
| 10* | −255.281 | 1.25 | 1.63910 | 23.5 |
| 11* | −11.726 | 0.15 | | |
| 12* | 6.200 | 1.90 | 1.54390 | 56.0 |
| 13* | 6.564 | BF | | |
| Image Plane | ∞ | | | |

| ASPHERIC DATA |
|---|

8th Surface
K = 0.00000e+000 A 4 = −4.26820e−003 A 6 = 1.77770e−003 A 8 = −2.26805e−004
A10 = 1.42590e−005 A12 = −3.72229e−007
9th Surface
K = 0.00000e+000 A 4 = −1.10581e−002 A 6 = 2.37005e−003 A 8 = −2.13564e−004
A10 = 9.92956e−006 A12 = −1.98013e−007
10th Surface
K = 0.00000e+000 A 4 = −2.65169e−003 A 6 = 3.87732e−004 A 8 = −3.29307e−005
A10 = 1.51180e−006 A12 = −2.70444e−008
11th Surface -continued UNIT: mm K = 0.00000e+000 A 4 = 1.51347e-003 A 6 = −3.58082e−004 A 8 = 3.04816e−005
A10 = −1.03923e−006 A12 = 1.28063e−008
12th Surface
K = 0.00000e+000 A 4 = −7.34033e−003 A 6 = 2.53991e−005 A 8 = 1.97107e−005
A10 = −1.02262e−006 A12 = 2.13649e−008 A14 = −1.76667e−010
13th Surface
K = 0.00000e+000 A 4 = −6.88663e−003 A 6 = 1.95188e−004 A 8 = −4.24138e−006
A10 = 3.40242e−008 A12 = 7.17160e−010 A14 = −1.74573e−011

| | |
|---|---|
| Focal length | 12.61 |
| F-number | 2.88 |
| Half angle of view (°) | 32.03 |
| image height | 7.89 |
| Overall lens length | 16.23 |
| BF | 4.82 |
| Entrance pupil position | 3.43 |
| Exit pupil position | −6.16 |
| Front principal position | 1.55 |
| Rear principal position | −7.79 |

SINGLE LENS DATA

| Lens | Starting surface | Focal length |
|---|---|---|
| 1 | 1 | 19.61 |
| 2 | 4 | 5.00 |
| 3 | 6 | −4.05 |
| 4 | 8 | −77.54 |
| 5 | 10 | 19.19 |
| 6 | 12 | 72.36 |

Numerical Example 3

UNIT: mm

Surface Data

| Surface No. | r | d | nd | vd |
|---|---|---|---|---|
| 1 | 4.861 | 1.00 | 1.72916 | 54.7 |
| 2 | 8.926 | 1.09 | | |
| 3 (Diaphragm) | ∞ | 0.55 | | |
| 4 | 7.814 | 0.81 | 2.00100 | 29.1 |
| 5 | −255.281 | 0.10 | | |
| 6 | −61.921 | 0.40 | 1.92286 | 20.9 |
| 7 | 6.728 | 1.52 | | |
| 8* | −10.405 | 0.80 | 1.68040 | 18.1 |
| 9* | −18.578 | 0.69 | | |
| 10* | −7.505 | 1.28 | 1.63560 | 23.9 |
| 11* | −5.889 | 0.12 | | |
| 12* | 7.492 | 1.90 | 1.54390 | 56.0 |
| 13* | 7.255 | BF | | |
| Image Plane | ∞ | | | |

ASPHERIC DATA

8th Surface
K = 0.00000e+000 A 4 = −1.16579e−002 A 6 = 9.23400e−004 A 8 = −1.96407e−004
A10 = 3.26667e−005 A12 = −5.02605e−006
9th Surface
K = 0.00000e+000 A 4 = −1.19318e−002 A 6 = 7.01526e−004 A 8 = 7.06491e−005
A10 = −1.24604e−005 A12 = 5.15017e−007
10th Surface
K = 0.00000e+000 A 4 = −2.01834e−004 A 6 = −1.54371e−004 A 8 = 3.25581e−005
A10 = −1.09711e−006 A12 = −2.61832e−009
11th Surface
K = 0.00000e+000 A 4 = 1.50168e−003 A 6 = −3.40868e−005 A 8 = −1.74033e−005
A10 = 1.74869e−006 A12 = −4.27577e−008
12th Surface
K = 0.00000e+000 A 4 = −6.28654e−003 A 6 = 7.04829e−005 A 8 = 1.06047e−005
A10 = −5.31978e−007 A12 = 9.95925e−009 A14 = −6.85704e−011

-continued

| UNIT: mm |
| --- |
| 13th Surface |
| K = 0.00000e+000  A 4 = −6.57786e−003  A 6 = 2.21104e−004  A 8 = −7.14307e−006 |
| A10 = 1.69631e−007  A12 = −2.34045e−009  A14 = 1.30153e−011 |

| | |
| --- | --- |
| Focal length | 12.61 |
| F-number | 2.88 |
| Half angle of view (°) | 32.03 |
| Image height | 7.89 |
| Overall lens length | 14.45 |
| BF | 4.19 |
| Entrance pupil position | 2.07 |
| Exit pupil position | −6.28 |
| Front principal position | −0.50 |
| Rear principal position | −8.42 |

SINGLE LENS DATA

| Lens | Starting surface | Focal length |
| --- | --- | --- |
| 1 | 1 | 13.26 |
| 2 | 4 | 7.59 |
| 3 | 6 | −6.56 |
| 4 | 8 | −36.20 |
| 5 | 10 | 32.91 |
| 6 | 12 | 231.34 |

Table 1 below illustrates various values in each numerical example.

| Numerical Value | Example 1 | Example 2 | Example 3 |
| --- | --- | --- | --- |
| SPIP | 13.741 | 12.915 | 12.360 |
| TTL | 15.351 | 16.225 | 14.450 |
| PNdave | 1.705 | 1.767 | 1.727 |
| f1 | 14.598 | 19.607 | 13.262 |
| f | 13.000 | 12.610 | 12.610 |
| f2 | 6.753 | 5.002 | 7.586 |
| f3 | −5.828 | −4.050 | −6.558 |
| BF | 5.111 | 4.815 | 4.193 |
| L1R2 | 12.606 | 16.892 | 8.926 |
| L1R1 | 6.172 | 8.823 | 4.861 |
| N ν dave | 23.88 | 20.09 | 19.49 |
| Conditional Expression | Example 1 | Example 2 | Example 3 |
| (1) SPIP/TTL | 0.895 | 0.796 | 0.855 |
| (2) PNdave | 1.705 | 1.767 | 1.727 |
| (3) f1/f | 1.123 | 1.555 | 1.052 |
| (4) f2/f | 0.519 | 0.397 | 0.602 |
| (5) f3/f | −0.448 | −0.321 | −0.520 |
| (6) BF/TTL | 0.333 | 0.297 | 0.290 |
| (7) (L1R2 + L1R1)/(L1R2 − L1R1) | 2.919 | 3.187 | 3.391 |
| (8) N ν dave | 23.88 | 20.09 | 19.49 |
| (9) TTL/f | 1.181 | 1.287 | 1.146 |

Image Pickup Apparatus

Figure 7:
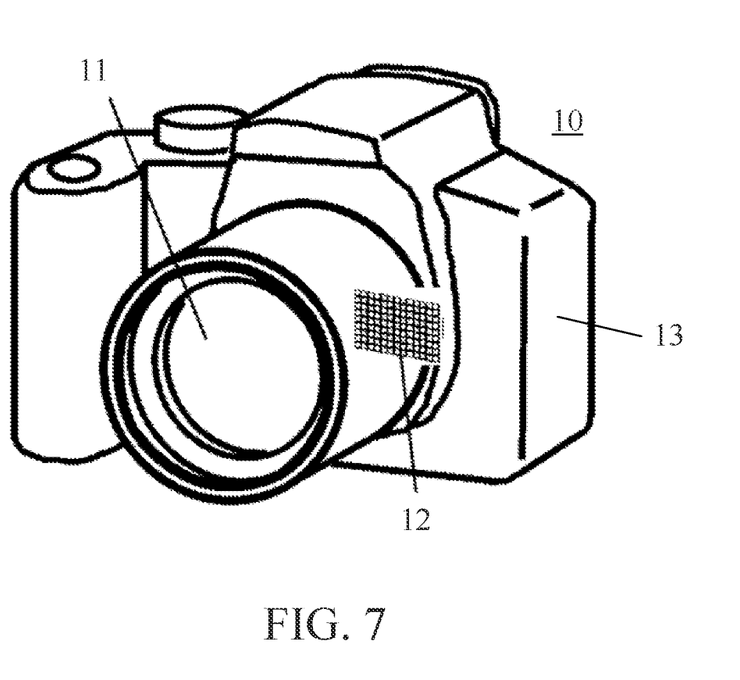
FIG. 7 is a schematic diagram of an image pickup apparatus.

Referring now to FIG. 7, a description will be given of an example of a digital still camera (image pickup apparatus) 10 using the optical system L0 according to each example as an imaging optical system. In FIG. 7, reference numeral 13 denotes a camera body, and reference numeral 11 denotes an imaging optical system that includes any one of the optical systems L0 described in Examples 1 to 3. Reference numeral 12 denotes a solid-state image sensor (photoelectric conversion element) such as a CCD sensor and a CMOS sensor, which is built in the camera body 13 and receives an optical image formed by the imaging optical system 11 and performs a photoelectric conversion. The camera body 13 may be a so-called single-lens reflex camera having a quick turn mirror, or a so-called mirrorless camera having no quick turn mirror.

By applying the optical system according to the present invention to an image pickup apparatus such as a digital still camera in this way, it is possible to obtain an image pickup apparatus having a short lens length and excellent optical performance while an oblique incidence on the periphery of the image sensor is suppressed.

The optical system according to each of the above examples is applicable not only to an image pickup apparatus such as a digital still camera but also to various optical apparatuses such as a telescope.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-069022, filed on Apr. 15, 2021, which is hereby incorporated by reference herein in its entirety.

What is claimed is:

1. An optical system comprising a plurality of lenses and a diaphragm,
   wherein the plurality of lenses consist of, in order from an object side to an image side, a first lens having a positive refractive power, a second lens having a positive refractive power, a third lens having a negative refractive power, a fourth lens, a fifth lens, and a sixth lens,
   wherein the diaphragm is located between the first lens and the second lens, and
   wherein the following inequalities are satisfied:

$0.5 < SPIP/TTL < 1.0$ $1.65 < PNdave < 2.00$ $-0.70 < f3/f < -0.25$ $0.20 < BF/TTL < 0.40$ where SPIP is a distance on an optical axis from the diaphragm to an image plane when a backfocus is expressed by an air-equivalent length, TTL is a distance on the optical axis from a lens surface on the object side of the first lens to the image plane when the backfocus is expressed by the air-equivalent length, PNdave is an average value of refractive indexes of all materials of positive lenses included in the optical system for d-line, f3 is a focal length of the third lens, f is a focal length of the optical system, and BF is an air-equivalent length of a distance on the optical axis from a lens surface on the image side of the sixth lens to the image plane.

2. The optical system according to claim 1, wherein the following inequality is satisfied:

$$0.80 < f1/f < 2.00$$

where f1 is a focal length of the first lens, and f is a focal length of the optical system.

3. The optical system according to claim 1, wherein the following inequality is satisfied:

$$0.30 < f2/f < 0.80$$

where f2 is a focal length of the second lens.

4. The optical system according to claim 1, wherein the following inequality is satisfied:

$$1.5 < (L1R2 + L1R1)/(L1R2 - L1R1) < 4.0$$

where L1R1 is a radius of curvature of a lens surface on the object side of the first lens, and L1R2 is a radius of curvature of a lens surface on the image side of the first lens.

5. The optical system according to claim 1, wherein the optical system includes two or more negative lenses, and the following inequality is satisfied:

$$15 < Nvdave < 30$$

where Nvdave is an average value of Abbe numbers for the d-line of all materials of the negative lenses included in the optical system.

6. The optical system according to claim 1, wherein the following inequality is satisfied:

$$0.90 < TTL/f < 1.40.$$

7. The optical system according to claim 1, wherein the fourth lens includes an area having a negative refractive power near the optical axis,
wherein aspherical surfaces are formed on both sides of the fourth lens,
wherein a lens surface on the object side of the fourth lens in the area is concave, and
wherein a lens surface on the image side of the fourth lens in the area is convex.

8. The optical system according to claim 1, wherein the fifth lens includes an area having a positive refractive power near the optical axis,
wherein aspherical surfaces are formed on both sides of the fifth lens,
wherein a lens surface on the object side of the fifth lens in the area is concave, and
wherein a lens surface on the image side of the fifth lens in the area is convex.

9. The optical system according to claim 1, wherein the sixth lens includes an area having a positive refractive power near the optical axis,
wherein aspherical surfaces are formed on both sides of the sixth lens,
wherein a lens surface on the object side of the sixth lens in the area is convex, and
wherein the lens surface on the image side of the sixth lens in the area is concave.

10. An image pickup apparatus comprising:
an optical system; and
an image sensor configured to receives an image formed by the optical system,
wherein the optical system includes a plurality of lenses and a diaphragm,
wherein the plurality of lenses consist of, in order from an object side to an image side, a first lens having a positive refractive power, a second lens having a positive refractive power, a third lens having a negative refractive power, a fourth lens, a fifth lens, and a sixth lens,
wherein the diaphragm is located between the first lens and the second lens, and
wherein the following inequalities are satisfied:

$$0.5 < SPIP/TTL < 1.0$$

$$1.65 < PNdave < 2.00$$

$$-0.70 < f3/f < -0.25$$

$$0.20 < BF/TTL < 0.40$$

where SPIP is a distance on an optical axis from the diaphragm to an image plane when a backfocus is expressed by an air-equivalent length, TTL is a distance on the optical axis from a lens surface on the object side of the first lens to the image plane when the backfocus is expressed by the air-equivalent length, and PNdave is an average value of refractive indexes of all materials of positive lenses included in the optical system for d-line, f3 is a focal length of the third lens, f is a focal length of the optical system, and BF is an air-equivalent length of a distance on the optical axis from a lens surface on the image side of the sixth lens to the image plane.

* * * * *